United States Patent [19]
Sanocki et al.

[11] Patent Number: 5,759,659
[45] Date of Patent: Jun. 2, 1998

[54] INSULATION BLANKET

[75] Inventors: Stephen M. Sanocki, Stillwater; Michael D. Swan, Woodbury; John L. Erickson, White Bear Township, Ramsey County; James A. Rustad, Fairmont, all of Minn.

[73] Assignee: Minnesota Mining and Manufacturing Company, St. Paul, Minn.

[21] Appl. No.: 770,838

[22] Filed: Dec. 20, 1996

Related U.S. Application Data

[62] Division of Ser. No. 370,515, Jan. 9, 1995, Pat. No. 5,624,726.

[51] Int. Cl.$^6$ .................. B32B 3/00; B64C 1/00
[52] U.S. Cl. .................. 428/74; 428/71; 428/76; 244/119
[58] Field of Search ................ 428/71, 74, 76; 244/119

[56] References Cited

U.S. PATENT DOCUMENTS

| | | | |
|---|---|---|---|
| H957 | 8/1991 | Borck et al. | 112/420 |
| 3,509,963 | 5/1970 | DePlante | 181/33 |
| 4,235,398 | 11/1980 | Johnson | 244/119 |
| 4,442,585 | 4/1984 | McGehee, Sr. et al. | 29/432 |
| 4,535,017 | 8/1985 | Kuckein et al. | 428/77 |
| 4,539,256 | 9/1985 | Shipman | 428/315.5 |
| 4,671,979 | 6/1987 | Adiletta | 428/74 |
| 4,726,987 | 2/1988 | Trask et al. | 428/282 |
| 4,726,989 | 2/1988 | Mrozinski | 428/315.5 |
| 4,767,656 | 8/1988 | Chee et al. | 428/116 |
| 4,837,067 | 6/1989 | Carey, Jr. et al. | 428/108 |
| 4,849,276 | 7/1989 | Bendig et al. | 428/117 |
| 4,880,680 | 11/1989 | Kistner | 428/74 |
| 4,926,963 | 5/1990 | Snyder | 181/290 |
| 5,030,518 | 7/1991 | Keller | 428/550 |
| 5,051,144 | 9/1991 | Kistner | 156/85 |
| 5,108,821 | 4/1992 | Dooley et al. | 428/198 |
| 5,169,700 | 12/1992 | Meier et al. | 428/74 |
| 5,240,527 | 8/1993 | Lostak et al. | 156/62.4 |
| 5,251,917 | 10/1993 | Chee et al. | 277/228 |
| 5,277,955 | 1/1994 | Schelhorn et al. | 428/74 |
| 5,298,694 | 3/1994 | Thompson et al. | 181/286 |
| 5,325,892 | 7/1994 | Japuntich et al. | 137/855 |
| 5,362,539 | 11/1994 | Hall et al. | 428/68 |
| 5,431,990 | 7/1995 | Haynes et al. | 428/218 |
| 5,472,760 | 12/1995 | Norvell | 428/71 |
| 5,552,205 | 9/1996 | Lea | 428/74 |
| 5,624,726 | 4/1997 | Sanocki et al. | 428/74 |

FOREIGN PATENT DOCUMENTS

| | | | |
|---|---|---|---|
| 0 221 662 | 5/1987 | European Pat. Off. | F16L 59/02 |
| WO 95/00362 | 1/1995 | European Pat. Off. | B60R 13/08 |
| WO 90/15181 | 12/1990 | WIPO | D06N 7/00 |

OTHER PUBLICATIONS

"Self–Extinguishing Insulation Covering", Boeing Material Specification, BMS 8–142T, Mar. 4, 1993.

*Primary Examiner*—Daniel Zirker
*Attorney, Agent, or Firm*—Gregory D. Allen

[57] ABSTRACT

Insulation blankets featuring a thermoplastic polyolefin protective covering.

14 Claims, 1 Drawing Sheet

INSULATION BLANKET

This is a division of application Ser. No. 08/370,515 filed Jan. 9, 1995, now U.S. Pat. No. 5,624,726.

BACKGROUND OF THE INVENTION

1. Field of the Invention

This invention relates to insulation blankets for providing thermal and/or acoustic insulation, e.g., in aircraft.

2. Description of the Related Art

Blankets providing thermal and/or acoustic insulation are used in aircraft and other vehicles to shield passengers from noise and temperature extremes. One problem with such blankets is moisture uptake. This problem is particularly significant in aircraft, where weight increases due to water entrapment in the blankets can be dramatic. Not only is moisture uptake undesirable from an economical standpoint, but it causes other problems as well. These problems include reduced thermal and acoustic performance, reduced service life for the blanket, and increased potential for corrosion on the aluminum skin and framing of the aircraft.

SUMMARY OF THE INVENTION

The invention provides an insulation blanket that includes fibrous insulation, foam insulation, or a combination thereof encased within a heat-sealable polymer comprising a rubber-toughened thermoplastic polyolefin.

The blanket preferably additionally includes a high temperature-resistant layer adjacent the insulation; such layer may be adhered to the insulation. The high temperature-resistant layer preferably includes ceramic fibers. One example of such a layer is a non-woven scrim comprising entangled ceramic oxide fibers.

The blanket may further include a check valve and/or a vapor-permeable layer configured to allow air to escape from said blanket while substantially preventing moisture from entering said blanket.

The insulation preferably is in the form of a lofty non-woven mat comprising thermoplastic fibers. The blanket is preferably essentially free of glass fibers.

The thermoplastic polyolefin preferably is polyethylene, polypropylene, an ethylene-propylene copolymer, or a combination thereof. Particularly preferred polymers are thermoplastic polyolefins which are flame retardant.

In another aspect, the invention provides an insulation blanket that includes a composite encased within a heat-sealable, flame retardant, thermoplastic polyolefin where the composite includes fibrous insulation, foam insulation, or a combination thereof and a high temperature-resistant layer adjacent the insulation.

In yet another aspect, the invention provides an insulation blanket that includes fibrous insulation, foam insulation, or a combination thereof encased within a heat-sealable polymer comprising a thermoplastic polyolefin in which the blanket is essentially free of glass fibers.

In yet another aspect, the invention provides an insulation blanket that includes a composite encased within a heat-sealable, flame retardant, rubber-toughened, thermoplastic polyolefin where the composite includes a lofty, non-woven mat comprising thermoplastic fibers and a high temperature-resistant layer comprising ceramic fibers adjacent the mat.

In yet another aspect, the invention provides an insulation blanket that includes fibrous insulation, foam insulation, or a combination thereof supported on one face of a vapor-permeable backing sheet and a heat-sealable polymer comprising a thermoplastic polyolefin sealed to the face of the vapor-permeable backing sheet.

In yet another aspect, the invention provides a method of insulating aircraft fuselage comprising providing the fuselage with an insulation blanket that includes fibrous insulation, foam insulation, or a combination thereof encased within a heat-sealable polymer comprising a rubber-toughened thermoplastic polyolefin.

In this application:

A "heat sealable" thermoplastic polyolefin refers to a material which, upon heating, softens and fuses together to form a seal.

"Insulation" refers to thermal and/or acoustic insulation.

A "high temperature resistant" material is a material which does not melt, flow, decompose, or otherwise substantially change shape at temperatures up to at least 500° C.

"Ceramic" refers to glass, glass-ceramic, and/or crystalline ceramic materials.

A "lofty" material is a fluffy material which, after compression and removal of the compressive force, substantially resumes its original shape.

A "flame retardant thermoplastic polyolefin" is a thermoplastic polyolefin which passes the vertical burn test described below in the section entitled "Test Procedures, Part E, Vertical Burn." The polyolefin may be inherently flame retardant (e.g., a chlorinated or brominated polyolefin) or may be compounded with one or more flame retardant compounds to render it flame retardant.

A "rubber-toughened" thermoplastic polyolefin is a polyolefin that includes a sufficient amount of an elastomeric component to give the polyolefin a tear resistance value of at least 15 kg/mm$^2$ (as measured according to the procedure described below in the section entitled "Test Procedures, Part A, Tear Resistance") and a puncture resistance value of at least 10 kg/mm$^2$ (as measured according to the procedure described below in the section entitled "Test Procedures, Part B, Puncture Resistance"). The elastomeric component may be in the form, e.g., of an elastomer blended with the polyolefin or a block copolymer in which one or more of the blocks is an elastomer.

A "vapor-permeable backing sheet" is a material which allows gases to flow through but substantially prevents passage of liquids (e.g., water) through it.

Insulation blankets according to the invention exhibit good resistance to moisture uptake as a consequence of the thermoplastic polyolefin outer covering. The thermoplastic polyolefin also provides a tough, tear-resistant covering for the insulation, thereby providing resistance to rips and/or punctures during installation and use. Blankets employing a flame retardant thermoplastic polyolefin exhibit good flame spread resistance. Furthermore, the inclusion of a high temperature-resistant layer adjacent the insulation layer provides enhanced fire barrier characteristics.

Blankets according to the present invention are useful in a variety of applications requiring thermal and/or acoustic insulation, including vehicles or other equipment for transporting, for example, passengers or cargo (e.g., aircraft, automobiles, trains, and boats). The blankets can be readily manufactured due to the conformability of the thermoplastic polyolefin polymer, which enables the polymer to be stretched and manipulated into a variety of desirable shapes. Moreover, because the polymer is heat sealable, it is not necessary to use adhesives to seal the polymer about the insulation, thereby reducing the weight and cost of the blanket, as well as reducing the presence of flammable components.

Other features and advantages of the invention will be apparent from the following description of the preferred embodiments thereof, and from the claims.

DESCRIPTION OF THE PREFERRED EMBODIMENTS STRUCTURE

Figure 1:
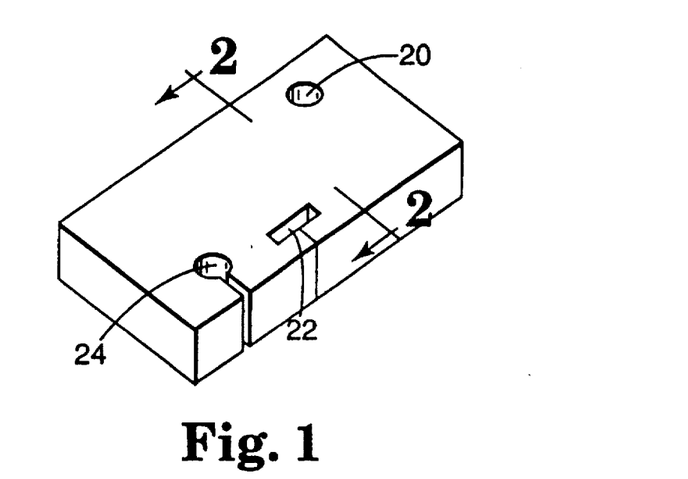
FIG. 1 is a plan view of an insulation blanket according to the invention.
Figure 2:
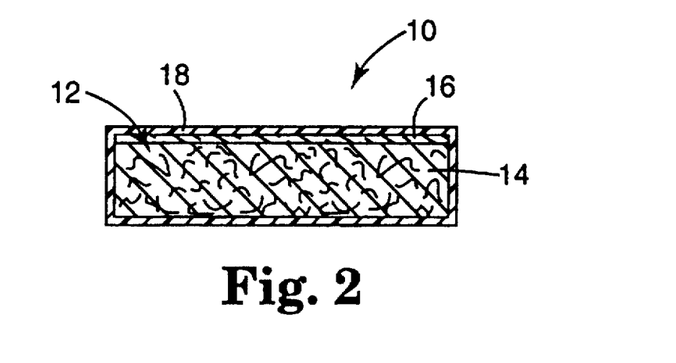
FIG. 2 is a cross-sectional view, taken at 2—2, of the insulation blanket shown in FIG. 1.

Referring to FIGS. 1 and 2, insulation blanket 10 includes a composite 12 that features an insulation layer 14 and a high temperature-resistant layer 16. Composite 12 is encased in a heat sealable thermoplastic polyolefin 18.

The primary function of thermoplastic polyolefin 18 is to minimize moisture ingress into blanket 10. Accordingly, preferred materials for thermoplastic polyolefin 18 exhibit water vapor transmission values no greater than 3 g/hour-$m^2$, as measured according to ASTM E-96-93 (Dessicant Method), hereby incorporated by reference. Under this test, water vapor transmission is determined by measuring the amount of water vapor transmitted through a film of the thermoplastic polyolefin. The amount of water vapor that passes through the film from a controlled humidity environment into a bed of silica gel over a 24 hour period is measured by determining the weight gain of the silica gel.

Particularly where blanket 10 is to be used for aircraft insulation (e.g., to insulate the fuselage of an aircraft), it is desirable that thermoplastic polyolefin 18 exhibit good tear resistance and puncture strength in order to minimize the occurrence of rips and tears during fabrication, installation, and use. Preferred materials for thermoplastic polyolefin 18 exhibit a tear resistance of at least 5 kg/$mm^2$ (preferably at least 15 kg/$mm^2$), as measured according to the test procedure described below in the section entitled "Test Procedures, Part A, Tear Resistance," and a puncture strength of at least 5 kg/$mm^2$ (preferably at least 10 kg/$mm^2$), as measured according to the test procedure described below in the section entitled "Test Procedures, Part B, Puncture Resistance."

Suitable materials for thermoplastic polyolefin 18 include high and low density polyethylene, polypropylene, ethylene-propylene copolymers, and mixtures thereof. The molecular weight and melt rheology are chosen such that the polyolefin readily softens and conforms to the shape of composite 12 to seal composite 12 within the polymer at temperatures routinely used for blanket processing (e.g., about 120°–160° C.).

To improve the tear and puncture resistance of the thermoplastic polyolefin 18, the polyolefin is preferably rubber-toughened. One way to accomplish this is by blending crosslinked elastomers with the thermoplastic polyolefin according to conventional techniques. Suitable elastomers for this purpose include polyisoprene, polybutadiene, polychloroprene, ethylene propylene diene monomer (EPDM) rubber, and combinations thereof. The particular amount of elastomer is chosen based upon the desired tear and puncture resistance. However, the amount is not so great as to adversely affect the heat sealability and conformability of the thermoplastic polyolefin. Examples of suitable thermoplastic polyolefin/elastomer blends include blends commercially available from Himont USA, Inc. of Wilmington, Del. under the trade designation "HIFAX." Also suitable are dynamically vulcanized blends such as those commercially available from Monsanto Co. of St. Louis, Mo. under the trade designation "SANTOPRENE."

Rubber-toughening may also be accomplished through the use of thermoplastic polyolefins which are in the form of block copolymers in which one or more of the blocks is an elastomer. Examples of elastomeric blocks include butadiene, isoprene, and EPDM blocks. Commercially available examples of suitable block copolymers include a thermoplastic elastomer available under the trade designation "HIFAX XL" from Himont USA, Inc. of Wilmington, Del. The block copolymers may also be blended with a crosslinked elastomer.

Particularly where the insulation blanket is to be used for aircraft insulation, it is preferred to use a thermoplastic polyolefin that is flame retardant as well. Flame retardancy may be achieved by blending the thermoplastic polyolefin with one or more flame retardant agents. Such agents are well-known in the art and include intumescent materials (e.g., sodium silicate, expanding graphite, and vermiculite), metal oxides (e.g., antimony trioxide), and organic halides (e.g., halogenated esters and anhydrides such as phthalate esters and anhydrides, e.g., tetrabromophthalic anhydride; halogenated ethers, e.g., tetrabromobisphenol A diglycidyl ether and decabromo-diphenyl oxide; and brominated biphenyls). Typically, such agents are blended with the thermoplastic polyolefin prior to extrusion in amounts up to about 30 weight percent.

Flame retardancy may also be achieved by choosing thermoplastic polyolefins which are themselves flame retardant. Examples of such polyolefins (which may be blended with the flame retardant agents described above as well) included halogenated polyolefins such as chlorinated and brominated polyethylene.

Other additives which may be blended with the thermoplastic polyolefin prior to extrusion include colorants (e.g., carbon black and colorants commercially available from Reed Spectrum of Minneapolis, Minn.) and melt processing aids. Colorants are typically added in the form of pellets in a ratio of about 20 parts polyolefin to about 1 part colorant.

A thermoplastic polyolefin which has been found to be particularly suitable for insulation blankets according to the invention is a rubber-toughened, ethylene-propylene copolymer (commercially available in the form of pellets from Himont USA Inc. of Wilmington, Del. under the trade designation "HIFAX CA-10A") compounded with a sufficient amount of flame retardant (specifically, equal molar ratios of antimony trioxide (having a specific gravity of 5.67 g/$cm^3$ and a melting point of 655° C.) and decabromodiphenyl oxide) such that a 60 micrometer thick film produced from the resulting ethylene-propylene coploymer containing the flame retardant meets the 12 second vertical burn test set forth in Federal Aviation Regulations 25.853A (described below in Section I.E. Vertical Burn), such film being produced as described below in the section entitled "Preparation of Thermoplastic Polyolefin, Thermoplastic Polyolefin 1," and exhibiting a water vapor transmission of 0.13 g/hour-$m^2$, a tear resistance of 26.3 kg/$mm^2$, and a puncture resistance of 46.6 kg/$mm^2$. Hereinafter, the ethylene-propylene coploymer containing the flame retardant shall be referred to as "flame retardant TPO."

Insulation layer 14 may include fibrous insulation, foam insulation, or a combination thereof, with lofty fibrous insulation being preferred. Suitable fibrous materials include fiberglass, polymer fibers (e.g., polypropylene fibers such as melt blown polypropylene fibers commercially available from The 3M Company of St. Paul, Minn. under the trade designation "THINSULATE"), chopped glass fibers (e.g., magnesium aluminosilicate glass fibers commercially available under the trade designation "S2-GLASS" from Owens-Corning Fiberglass Corp. of Granville, Ohio), and ceramic oxide fibers (e.g. small diameter melt-blown aluminosilicate ceramic fibers commercially available under the trade designations "FIBERFRAX DURABACK BLANKET" from Carborundum Co., Niagara Falls, N.Y. and "CERWOOL" from Premier Refractories and Chemicals, Inc., of King of Prussia, Pa. as well as ceramic oxide fibers commercially available from the 3M Company under the trade designation "NEXTEL" (e.g., aluminosilicate ceramic oxide fibers commercially available under the trade designation "NEXTEL 440," aluminoboroslicate ceramic oxide fibers commercially available under the trade designation "NEXTEL 312," and alumina ceramic oxide fibers commercially available under the trade designation "NEXTEL 610")), with polymer fibers being preferred.

The fibrous insulation is preferably provided in the form of a lofty non-woven mat in which the fibers are entangled with or bonded to each other. Such mats are prepared according to conventional techniques such as melt blowing, air laying, or carding. The mats can be made with thermobonding fibers and exposed to heat to cause the thermobonding fibers to soften and bind at least some of the fibers together.

An example of a particularly preferred lofty non-woven mat is described in U.S. Pat. No. 4,837,067 (Carey et al.), the disclosure of which is hereby incorporated by reference. As described therein, the mat consists of a combination of entangled staple fibers and bonding staple fibers where the bonding fibers have a core of polyethylene terephthalate surrounded by a sheath of an adhesive polymer formed from isophthalate and terephthalate esters.

Examples of foams which are useful for insulation layer 14 include polymeric foams such as polyurethane and polyimide foams.

In applications where a fire barrier is important (e.g., aircraft applications), composite 12 preferably includes a high temperature-resistant layer 16 adjacent insulation 14. As shown in the figures, composite 12 features one insulation layer and one high temperature-resistant layer. However, the composite may contain multiple high temperature-resistant layers and/or insulation layers as well. For example, the composite may feature an insulation layer sandwiched between two high temperature-resistant layers. Alternatively, the composite may feature a high temperature-resistant layer sandwiched between two insulation layers.

Suitable materials for layer 16 include ceramic paper (e.g., an aluminosilicate ceramic fiber paper commercially available under the trade designation "LYTHERM PAPER" from Lydall, Inc. of Rochester, N.H.), woven ceramic fibers (e.g., fabrics commercially available under the trade designation "NEXTEL 312 AF-10 AEROSPACE FABRIC" from the 3M Company), woven fiberglass fibers (e.g., fabrics commercially available under the trade designation "SILTEMP SILICA FABRIC TYPE 84CH" from Ametek of Wilmington, Del. ), ceramic non-woven scrims (e.g., scrims prepared from ceramic oxide fibers commercially available under the trade designation "NEXTEL 312 CERAMIC FIBERS" from the 3M Company), and fiberglass nonwoven scrims, with ceramic non-woven scrims being preferred. Such scrims are typically prepared according to the process described in Sanocki et al., U.S. Ser. No. 08/081,818 entitled "Flexible Nonwoven Mat," which is assigned to the same assignee as the present application and hereby incorporated by reference. According to this process, the ceramic fibers of the scrim are physically entangled, e.g., by needle punching or hydroentangling.

High temperature-resistant layer 16 is preferably attached to insulation 14 to facilitate assembly and handling of the blanket. Where layer 16 and insulation 14 are both made of fibrous materials, the two layers may be attached to each other by laying one on top of the other, thereby causing the fibers in one layer to become entangled with fibers from the other layer. It is preferred, however, to adhere the two layers together, e.g., by means of a spray adhesive. Such adhesives are commercially available, e.g., under the designation "SUPER 77 SPRAY ADHESIVE" from the 3M Company. Other methods of joining the two layers include needle punching, stitching, and heat bonding. In the case of heat bonding, thermobonding fibers are first incorporated in layer 16. The composite is then exposed to heat, thereby causing the thermobonding fibers of both layers to soften and bind to the insulation material.

If desired, insulation layer 14 (or composite 12 if the blanket includes a high temperature-resistant layer) may be provided with one or more through-holes or slits extending through the thickness of the layer (or composite). The through-holes may be provided in a variety of shapes, including cylindrical (through-hole 20), rectangular (through-hole 22), and keyhole (through-hole 24). The inclusion of through-holes facilitates installation of the blanket. The thermoplastic polyolefin film extends through the through-hole such that all surfaces of insulation layer 14 (or composite 12) are covered with the thermoplastic polyolefin film.

Particularly where blanket 10 is to be used in applications where pressure changes are experienced (e.g., aircraft), it is desirable to provide means for equalizing pressure within the blanket to prevent it from exploding. One way of doing this is to install a check valve in the blanket that enables air to escape from the blanket as pressure inside the blanket increases. Preferably, the valve allows air to escape but substantially prevents moisture from entering the blanket. The valve preferably is located between the insulation layer (or composite, if a high temperature-resistant layer is used) and one of the thermoplastic polyolefin films, and attached to the films, e.g., by heat-sealing or by means of an adhesive. A variety of valves suitable for this purpose are known in the art, an example of which is described in U.S. Pat. No. 5,325,892 (Japuntich et al.), the disclosure of which is hereby incorporated by reference.

Another means of allowing air to escape from the blanket, while minimizing the ability of moisture to enter the blanket, is to incorporate a vapor-permeable layer between the insulation layer (or composite, if a high temperature-resistant layer is included) and the thermoplastic polyolefin film. Examples of suitable materials for the vapor-permeable layer include breathable membranes such as spun bond polyethylene membranes (e.g., commercially available from E. I. DuPont de Nemours & Co. of Wilmington, Del. under the designation "TYVEK") and membranes described in U.S. Pat. No. 4,539,256 (Shipman) and U.S. Pat. No. 4,726,989 (Mrozinski), the disclosures of which are hereby incorporated by reference.

Although in all of the above-described embodiments, the thermoplastic polyolefin is shown as encasing insulation layer 14 (and composite 12, where a high temperature-resistant layer is included), blankets may be constructed in which one side is not covered by the thermoplastic polyolefin. For example, a vapor-permeable membrane as described above may be used as a backing sheet on which the insulation layer (or composite, if a high temperature-resistant layer is included as well) is deposited. The thermoplastic polyolefin may then be sealed to the face of the vapor-permeable membrane supporting the insulation layer (or composite), leaving the opposite face of the membrane uncovered and able to perform the pressure-equalization function described above, while minimizing moisture ingress.

Blanket Preparation

In a typical blanket preparation, a composite containing insulation layer 14 and high temperature-resistant layer 16 is assembled first. If desired, through penetrations are die- or scissor-cut through the entire thickness of the composite. A sheet of thermoplastic polyolefin is then provided having dimensions slightly greater than the dimensions of the composite on all sides to facilitate heat sealing. The thermoplastic polyolefin is placed on top of a release liner (e.g., a polyester release liner) to prevent the thermoplastic polyolefin from sticking (e.g., to heating elements or conveyor belts during blanket manufacture). The composite is then laid on top of the thermoplastic polyolefin sheet, after which a second thermoplastic polyolefin sheet (having the same dimensions as the first thermoplastic polyolefin sheet) is draped over the top of the composite.

The top and bottom thermoplastic polyolefin sheets are sealed together using any of a variety of conventional sealing techniques. Such techniques include pressing the sheets between heating elements to seal them; moving the blanket through a hot air oven or conveying oven to seal the sheets together at the point of contact, as well as heat shrinking the sheets around the composite; sonic welding the sheets together (using a sonic sealer such as that commercially available from Sonobond Ultrasonics of Westchester, Pa. under the designation "SONOBOND LACEMAKER 20"); or heating the blanket on a hot plate while pressing the sheets together. To seal through-penetrations, it is preferable to use an implement having a shape that conforms to the shape of the penetration to press the sheets together through the penetration.

Following the sealing operations, any excess thermoplastic polyolefin material is trimmed away. If desired, the thermoplastic polyolefin sheets may be subjected to further heat treatment (e.g., in a conveying oven or by exposure to quartz heaters) to heat shrink the sheets and thereby improve the overall appearance of the blanket.

If valves are to be used, they are typically incorporated into the thermoplastic polyolefin material prior to blanket assembly. Typically, a lip on the valve is heat-sealed to the thermoplastic polyolefin using, e.g., a sonic sealer whereby a sonic horn approximately the same size and shape as the valve lip is placed in contact with the thermoplastic polyolefin, thereby sealing it to the valve lip. The thermoplastic polyolefin covering the opening of the valve is then removed following sealing. Alternatively, adhesive can be used to mount the valve at a desired location before or after assembly of the blanket. In addition, rather than removing thermoplastic polyolefin covering the valve opening following sealing, the thermoplastic polyolefin can be provided with a hole before the valve is mounted.

The blankets are useful in a variety of applications requiring thermal and/or acoustic insulation, e.g., aircraft, automobiles, and other vehicles. The blankets are particularly useful as fire barriers. The blankets can be readily manufactured and do not require adhesives to seal the protective polymer film about the insulation, thereby reducing the weight and cost of the blanket, as well as the presence of flammable components.

Objects and advantages of this invention are further illustrated by the following examples, but the particular materials and amounts thereof recited in these examples, as well as other conditions and details, should not be construed to limit this invention. All parts and percentages are by weight unless otherwise indicated.

EXAMPLES

I. Test Procedures

A. Water Vapor Transmission (ASTM E-96-93)

The water vapor transmission of the thermoplastic polyolefin was measured according to ASTM E-96-93 using the desiccant method described therein with silica gel.

B. Puncture Resistance

The puncture resistance of the thermoplastic polyolefin was measured by pushing a round metal rod having a flat top and a diameter of 2.28 mm (total surface area of about 4.08 $mm^2$) through the film at a rate of 200 mm/min. and recording the maximum force at failure.

C. Tear Resistance

The tear resistance of the thermoplastic polyolefin was measured using a tensile testing machine commercially available from Sintek Division of MTS Systems Corp. of Stoughton, Mass. Sample strips of a film of the thermoplastic polyolefin measuring 20 mm in width and having a thickness of 60 micrometers were provided with a small 5 mm notch on the side of each sample using a razor blade. The sample was then placed in the jaws of the tensile testing machine and pulled apart at a rate of 150 mm/min. The maximum force to failure was divided by the film thickness and then recorded as a measure of the tear resistance of the film.

D. Simulated Cargo Liner Burn Test

The simulated cargo liner burn test used here is found in Boeing Support Specification Standard No. BSS 7323 modified to permit testing on a laboratory scale.

The test was conducted as follows.

A propane blow torch (commercially available under the designation "SUREFIRE T655" from Surefire Co. of Medina, N.Y.) was set in a clamp so that the flame was vertical. The regulator of the torch was set to the fully open position to give a maximum strength flame. A supporting unit (consisting of a U-shaped aluminum sheet, each side of which measured 30 cm×30 cm×30 cm) was set up to hold samples to be tested such that the base of the sample was about 10 mm from the top of the flame; the sample rested between the arms of the U-shaped sheet. A type K thermocouple connected to a temperature reading device (commercially available as model HH82 from Omega of Stamford, Conn.) was then positioned over the center of the flame such that it rested about 75 mm above the top of the sample.

To begin the test, the sample (measuring 30.5 cm square and 7.5 cm in thickness) was placed such that it rested between the arms of the U-shaped sheet. At time T=0, the burner and a stop watch were started. Visual observations were made of the burn characteristics of each sample, along with measurements of the cold side sample temperature (i.e., the temperature of the side of the sample furthest from the flame) as a function of time. The time necessary for the flame to burn through the sample, the time necessary for cold side ignition, and the maximum cold side temperature were all recorded.

E. Vertical Burn

Samples of thermoplastic polyolefin film were tested according to the vertical burn test described in Federal Aviation Regulations Part 25.853A, Boeing Material Technology Test BSS 7230 set up on a laboratory scale. Each sample measured 7.6 cm wide×30.5 cm long, and was suspended from a holding fixture such that it was held vertically over a vertical flame from a propane blow torch. The sample was exposed to the flame for 12 seconds. A sample was said to have passed the vertical burn test if the sample did not burn along its entire length during the 12 second test period.

II. Preparation of Thermoplastic Polyolefin

Thermoplastic Polyolefin 1

Five kilograms of flame retardant TPO pellets were fed into the hopper of a 6.35 cm, 30:1, single screw extruder (commercially available from Johnson Plastics of Chippewa Falls, Wis.) driven by a 75 horsepower motor and equipped with an 86.4 cm auto flex coat hanger die (commercially available from Extrusion Dies of Chippewa Falls, Wis.). The extruder was maintained at 221° C. in the feed zone. The temperature was ramped up such that it reached 254° C. at the end of the extruder barrel. A flat temperature profile of 232° C. was maintained across the die.

The molten polymer was extruded horizontally through two rolls of a three roll stack (commercially available from HPM of Mount Gilead, Ohio), and then run over the third roll to form a film. The thickness of the film was monitored using a Beta gauge connected by a feedback loop to the die in order to maintain a uniform film thickness of approximately 60 micrometers. The finished film was then wound onto a cardboard core using a Gloucester wind-up station (commercially available from Gloucester Engineering Co. of Gloucester, Mass.). By adjusting the wind-up rate to be greater than the rate at which the film was fed onto the third roll of the three roll stack, the film was oriented in the machine direction.

The resulting thermoplastic polyolefin film was 73.7 cm wide. It exhibited a water vapor transmission of about 0.13 g/hour-m$^2$, a tear resistance of about 26.1 kg/mm$^2$, and a puncture resistance of about 46.0 kg/mm$^2$. The film also passed the vertical burn test.

Thermoplastic Polyolefin 2

A thermoplastic polyolefin film was prepared according to the procedure used to prepare Thermoplastic Polyolefin 1 except that the thermoplastic polyolefin pellets were flame retardant TPO pellets that also include carbon black as a colorant. The resulting film (which was black in color) was approximately 60 micrometers thick, 73.7 cm wide, and exhibited a water vapor transmission of about 0.13 g/hour-m$^2$, a tear resistance of about 26.6 kg/mm$^2$, and a puncture resistance of about 47.0 kg/mm$^2$. The film also passed the vertical burn test.

Thermoplastic Polyolefin 3

A thermoplastic polyolefin film was prepared according to the procedure used to prepare Thermoplastic Polyolefin 1 except that prior to extrusion, the thermoplastic polyolefin pellets were tumbled for 1 hour in a drum with a green coloring agent (commercially available as "olive green" in a polyethylene carrier from Reed Spectrum of Minneapolis, Minn.) to produce an olive green-colored film. The film was approximately 60 micrometers thick, 73.7 cm wide, and exhibited a water vapor transmission of about 0.13 g/hour-m$^2$, a tear resistance of about 26.3 kg/mm$^2$, and a puncture resistance of about 48.0 kg/mm$^2$. The film also passed the vertical burn test.

Thermoplastic Polyolefin 4

A thermoplastic polyolefin film was prepared according to the procedure used to prepare Thermoplastic Polyolefin 1 except that prior to extrusion, the thermoplastic polyolefin pellets were tumbled for 1 hour in a drum with a dark blue coloring agent (commercially available as "blue" in a polyethylene carrier from Reed Spectrum of Minneapolis, Minn.) to produce a blue-colored film. The film was approximately 60 micrometers thick, 73.7 cm wide, and exhibited a water vapor transmission of about 0.13 g/hour-m$^2$, a tear resistance of about 26.3 kg/mm$^2$, and a puncture resistance of about 45.5 kg/mm$^2$. The film also passed the vertical burn test.

Preparation of Insulation Layer

The insulation layer was prepared from two staple fibers: a sheath core polyethylene terephthalate (PET) fiber (commercially available as a 2 denier fiber under the trade designation "CELBOND FIBER, TYPE K54" from Hoescht Celanese of Greenville, S.C.) and a non-sheath core PET fiber (commercially available as a 1.2 denier fiber under the trade designation "TREVIRA FIBER TYPE T121" from Hoescht Celanese of Greenville, S.C.). The fibers were formed into a non-woven mat using equipment commercially available from Hergeth Hollingsworth, Spartenberg, S.C.) as follows.

The fibers (which were purchased in bale form) were loaded by hand in 10 kilogram batches into a Multi Tuft Opener in a ratio of 50% T121 PET fibers to 45% K54 PET sheath core fibers. From the Multi Tuft Opener, the fibers were transported to a Flock feed and then into a Master Chute which fed into a 1 meter wide carding machine. The carding machine transformed the fibers into a web weighing about 33 g/m$^2$. The web was then transported through a crosslapper to achieve a web thickness of 85 mm with about 10 layers, resulting in a web weighing 330 g/m$^2$. Next, the cross-lapped web was passed through a conveying oven (available from Industrial Heat Enterprises International of Franklin, Wis.) maintained at 160° C. at a rate of about 61 cm/min. After exiting the oven, an idler roller was used to compress the web to a thickness of 76 mm. The web was then rolled up on a cardboard core and stored for subsequent incorporation into an insulation blanket.

IV. Preparation of High Temperature-Resistant Layer

High Temperature-Resistant Layer 1

About 2.27 kilograms of aluminoborosilicate fiber (commercially available as a 2000 denier roving under the trade designation "NEXTEL 440 Ceramic Fiber" from the 3M Company) was formed into a non-woven mat by chopping tows of the fibers into 2.5 cm lengths using a glass roving cutter (commercially available under the designation "MODEL 90 GLASS ROVING CUTTER" from Finn & Fram, Inc. of Pacoima, Calif.). The cut fiber lengths were then passed through a two cylinder fiber opener (commercially available under the designation "LAROCHE MODEL CADETTE 500" from McKittrick Agency, Inc. of Charlotte, N.C.); each cylinder was rotating at approximately 900 rpm.

After exiting the fiber opener, the fiber lengths were placed in a conventional fiber feeding system (commercially available under the trade designation "MODEL EF22 CMC EVEN FEED") from Carolina Machinery Co. of Charlotte, N.C.) and then fed into a convention web-forming machine (commercially available under the designation "DAN WEB" from Scan Web Co. of Denmark) which drew the fiber lengths onto a wire screen to form a mat having a weight per unit area of about 75 g/m$^2$ and a thickness of about 1 mm. The mat was then needle punched using a conventional needle punching apparatus (commercially available under the designation "DILO" from Dilo of Germany) equipped with type #15×18×363.5 RB barbed needles (commercially available from Foster Needle Co., Inc. of Manitowoc, Wis.) to provide about 5 punches/cm² of fabric. The barbed needles were punched through the full thickness of the mat.

High Temperature-Resistant Layer 2

A non-woven mat was prepared as described in the case of High Temperature-Resistant Layer 1 except that 0.227 kg of thermoplastic staple PET fibers (commercially available under the designation "CELBOND FIBER, TYPE K54" from Hoescht Celanese of Greenville, S.C.) were mixed with the chopped ceramic fibers by hand prior to being added to the fiber opener. The resulting mat was about 1 mm thick.

High Temperature-Resistant Layer 3

A non-woven mat was prepared as described the case of High Temperature-Resistant Layer 1 except that the fibers were hydroentangled, rather than needle-punched, using a laboratory, single-head, water-entangling unit (commercially available from Honeycomb Systems Inc. of Bidderford, Mass.). The unit was equipped with a coarse 30 mesh-type stainless steel woven screen located about 2.5 cm below the water jet head (which measured 61 cm in length and had a single row containing sixteen 0.127 mm diameter orifices per cm).

The fibers were passed under the water jet in a direction perpendicular to the row of orifices three times to form the fibers into a mat. For the first pass, the water pressure was set at a relatively low value (i.e., no greater than about 350 kPa) to pre-wet the fibers. For the second pass, the water pressure was increased to about 2400 kPa and during the third pass the water pressure was about 4500 Pa. The line speed for all three passes was about 3.7 m/min. Following the third pass, the mat was dried in a conventional hot air oven to yield a mat having a thickness of about 1 mm.

V. Preparation of Blanket

Example 1

An insulation layer (prepared as described above in section III) and a high temperature-resistant layer (prepared as described above in the case of High Temperature-Resistant Layer 1) were cut into sheets measuring 43.2 cm×83.82 cm. The high temperature-resistant layer was then attached to the insulation layer by means of a spray adhesive (commercially available under the designation SUPER 77 SPRAY ADHESIVE from the 3M Company).

A thermoplastic polyolefin film (prepared as described above in the case of Thermoplastic Polyolefin 1), measuring 73.7 cm wide, was cut into lengths measuring 101.6 cm each. One length of film was laid flat on a table, and the insulation layer/high temperature-resistant layer composite was placed on top of the film with the insulation layer face contacting the polyolefin film. A second length of film was then draped over the high temperature-resistant layer face of the composite. A 45.7 cm long Tabletop Impulse Sealer (commercially available from Packaging Aids Corporation of San Rafael, Calif.) with the vacuum portion removed and having a 0.32 cm wide heating element was used to seal the two film sheets around the perimeter of the composite while applying minimal tension to avoid tearing of the hot film to yield an insulation blanket.

Example 2

An insulation blanket was prepared according to Example 1 except that a high temperature-resistant layer prepared as described in the case of High Temperature-Resistant Layer 2 was used. The high temperature-resistant layer was bonded to the insulation layer by placing one layer on top of the other, and then sending the composite through a hot air oven (a Despatch V Series oven, model VRC2-19-1E commercially available from Despatch Industries of Minneapolis, Minn.). Upon removed from the oven, the composite was compressed slightly using a free-floating roller to a thickness of about 76 mm to help adhere the two layers together.

Example 3

An insulation blanket was prepared according to Example 1 except that the polyolefin films were sealed together by heat shrinking. Specifically, the polyolefin-draped composite was sent at a rate of 61 cm/min. through a flatbed conveying oven (commercially available from Industrial Heat Enterprises International of Franklin, Wis.) maintained at 148.9° C.; the total residence time in the oven was about 2 minutes. Application of heat caused the top and bottom polyolefin films to bond together in all areas where the two films were in contact with each other, and to shrink around the composite, thereby forming a close-fitting covering around the composite.

Example 4

This example illustrates the preparation of an insulation blanket provided with a through-hole penetration.

Four hot plates (Model No. 700-5011, commercially available from Barnant Co. of Barrington, Ill., each measuring about 15.2 cm square, were grouped together to form a square measuring 61 cm in width, with one hot plate at each corner of the square. The heat indicator of each hot plate was turned to level 3 and a 1.25 cm thick anodized aluminum plate laid across the surface formed by the four hot plates. The plate was heated for 30 minutes until it reached a temperature of 127° C. (as measured using a surface thermometer available from Pacific Transducer Corp. of Los Angeles, Calif. as Model #310F).

An insulation blanket was assembled by preparing a sandwich consisting of an insulation layer (prepared as described in section III, above) placed between a layer of black thermoplastic polyolefin film prepared as in the case of Thermoplastic Polyolefin 2 (described above) and a layer of white thermoplastic polyolefin film prepared as in the case of Thermoplastic Polyolefin 1 (described above). The insulation layer measured 25 cm×46 cm×8.9 cm, and had a 3.8 cm diameter hole in the middle of the layer that extended through the thickness of the insulation layer. Each thermoplastic polyolefin film was cut such that it was 15.2 cm longer than the insulation layer on all four sides.

The sandwich was placed on a 0.01 cm thick sheet of a polyester release liner, and the resulting construction laid on top of the aluminum plate with the black thermoplastic polyolefin film facing the top of the hot aluminum plate. Next, the thermoplastic polyolefin layers were sealed together by compressing the insulation layer at the edges using a straight edge and hand pressure, and then rolling a 5.1 cm wide rubber roller on the film extending from the edge of the insulation at a rate of about 0.05 seconds/cm.; the change in transparency of the film indicated that sealing had occurred.

After the films had been sealed together, a 3.8 cm diameter silicone rubber plunger was pressed into the hole in the middle of the blanket, thereby pushing the top thermoplastic polyolefin film through the hole and into contact with the bottom thermoplastic polyolefin film while the blanket remained on the hot aluminum plate. The plunger was held in place for about 3 seconds, and then left in place as the blanket was removed from the hot aluminum plate to assure a good seal at the hole. The plunger was then removed and excess film around the edges of the blanket and the hole were trimmed. Finally, the blanket was passed under a quartz lamp (commercially available under the designation "CHROMALOX" from Emerson Electric Co. of Pittsburgh, Pa.) at a rate of 5.1 cm/s to further heat shrink the thermoplastic polyolefin films. The thickness of the insulation layer in the blanket was measured and found to be substantially the same as its initial thickness (i.e., prior to blanket formation).

Example 5

A blanket was prepared as in Example 4 except that the insulating layer was a 2.5 cm thick layer of fiberglass commercially available under the designation "MICROLITE AA" from Schuller of Denver, Colo. The insulation was cut into an oblong piece measuring 29.2 cm×38.1 cm, and having a keyhole cut from the edge into its center. The keyhole was 1.25 cm wide and 2.5 cm in diameter at its widest point. A keyhole-shaped silicone rubber plunger was used to seal the two thermoplastic polyolefin films together through the keyhole in the insulation layer.

VI. Results of Cargo Liner Burn Test

The following materials were subjected to the Cargo Liner Burn Test (described above under "Test Procedures, Part D, Simulated Cargo Liner Burn Test"):

Sample #1: Three layers of fiberglass (each 2.5 cm thick) commercially available from Schuller of Denver, Colo. under the designation "MICROLITE AA" stacked on top of each other (no adhesive between layers).

Sample #2: Sample #1 plus a ceramic fiber nonwoven scrim (High Temperature-Resistant Layer 1) placed on the fiberglass (no adhesive between scrim and fiberglass) and facing the flame.

Sample #3: Sample #2 plus a sheet of thermoplastic polyolefin (Thermoplastic Polyolefin 2) placed on the fiberglass (no adhesive between polyolefin and fiberglass) such that the polyolefin was on the cold side of the structure.

Sample #4: Sample #3 plus a sheet of polyethylene terephthalate film commercially available under the trade designation "ORCOFILM AN-37" from Orcon Corp. of Union City, Calif. (0.64 grams/m$^2$) placed on the fiberglass (no adhesive between film and fiberglass) such that the film was on the cold side of the structure.

Sample #5: A 7.6 cm thick fibrous insulation layer prepared as described in Section III, above.

Sample #6: Sample #5 plus a ceramic fiber nonwoven layer (High Temperature-Resistant Layer 1) placed on the insulation layer (no adhesive between nonwoven layer and insulation layer) and facing the flame.

Sample #7: Sample #6 plus a sheet of thermoplastic polyolefin (Thermoplastic Polyolefin 2) placed on the insulation layer (no adhesive between polyolefin and insulation) such that the polyolefin was on the cold side of the structure.

Sample #8: Sample #6 plus a sheet of polyethylene terephthalate film ("ORCOFILM AN-37") placed on the fiberglass (no adhesive between film and fiberglass) such that the film was on the cold side of the structure.

The results are shown below in Table 1, below.

TABLE 1

| Sample | Time to burn through, sec. | Time to cold side film ignition, min. | Max. cold side temp., °C. @ min. |
|---|---|---|---|
| 1 | 82 | N/A | 500 @ 1.25 |
| 2 | N/A | N/A | 37 @ 20 |
| 3 | N/A | No Ignition | 37 @ 20 |
| 4 | N/A | 17 | 375 @ 18 |
| 5 | 6 | N/A | 500 @ 0.1 |
| 6 | N/A | N/A | 135 @ 0.1 |
| 7 | N/A | 10 | 400 @ 0.25 |
| 8 | N/A | 10 | 120 @ 0.3 |

The designation "N/A" appearing in Table 1 indicates that the sample did not burn through its thickness for the duration of the test (indicated by the number of minutes appearing in the column of Table 1 designated "Max. cold side temp., °C. @ min."). As shown in Table 1, addition of a ceramic oxide layer increased the time to burn through the structure and reduced the temperature on the cold side of the blanket. Replacement of the polyethylene terephthalate ("ORCOFILM AN-37") film with a thermoplastic polyolefin film according to the invention also resulted in longer cold side ignition times and lower maximum cold side temperatures.

Various modifications and alterations of this invention will become apparent to those skilled in the art without departing from the scope and spirit of this invention, and it should be understood that this invention is not to be limited to the illustrative embodiments set forth herein.

What is claimed is:

1. An insulation blanket comprising a composite encased with a heat-sealable polymer, said heat-sealable polymer comprising a flame retardant thermoplastic polyolefin, said composite comprising fibrous insulation, foam insulation, or a combination thereof and a high temperature-resistant layer adjacent said insulation.

2. The blanket of claim 1 wherein said high temperature-resistant layer is adhered to said insulation.

3. The blanket of claim 1 wherein said high temperature-resistant layer comprises ceramic fibers.

4. The blanket of claim 1 wherein said high temperature-resistant layer comprises a non-woven scrim comprising entangled ceramic oxide fibers.

5. The blanket of claim 1 wherein said insulation comprises a lofty non-woven mat comprising thermoplastic fibers.

6. The blanket of claim 1 wherein said blanket is essentially free of glass fibers.

7. The blanket of claim 1 wherein said thermoplastic polyolefin is selected from the group consisting of polyethylene, polypropylene, an ethylene-propylene copolymer, and a combination thereof.

8. The blanket of claim 1 wherein said thermoplastic polyolefin is rubber-toughened.

9. The blanket of claim 1 further comprising a check valve configured to allow air to escape from said blanket while substantially preventing moisture from entering said blanket.

10. The blanket of claim 1 further comprising a vapor-permeable layer configured to allow air to escape from said blanket while substantially preventing moisture from entering said blanket.

11. An insulation blanket comprising a composite encased within a heat-sealable polymer comprising a flame retardant, rubber-toughened, thermoplastic polyolefin, said composite comprising a lofty non-woven mat comprising thermoplastic fibers and a high temperature-resistant layer comprising ceramic fibers adjacent said mat.

12. An insulation blanket comprising fibrous insulation, foam insulation, or a combination thereof supported on one face of a vapor-permeable backing sheet and a heat-sealable polymer comprising a thermoplastic polyolefin sealed to said face of said vapor-permeable backing sheet.

13. The blanket of claim 12 further comprising a high temperature-resistant layer adjacent said insulation.

14. The blanket of claim 12 wherein said thermoplastic polyolefin is rubber-toughened.

* * * * *

UNITED STATES PATENT AND TRADEMARK OFFICE
CERTIFICATE OF CORRECTION

PATENT NO. : 5,759,659
DATED : June 2, 1998
INVENTOR(S) : Sanocki et al.

It is certified that error appears in the above-identified patent and that said Letters Patent is hereby corrected as shown below:

Column 10:
Line 24, "ratio of 50%" should read --ratio of 55%--

Signed and Sealed this

Twelfth Day of June, 2001

*Attest:*

*Attesting Officer*

NICHOLAS P. GODICI
*Acting Director of the United States Patent and Trademark Office*